(12) United States Patent
Rhys

(10) Patent No.: US 12,427,351 B1
(45) Date of Patent: Sep. 30, 2025

(54) SWIMMING POOL FIRE SUPPRESSION MEANS AND DELIVERY SYSTEM THEREFOR

(71) Applicant: Dulais Rhys, Billings, MT (US)

(72) Inventor: Dulais Rhys, Billings, MT (US)

( * ) Notice: Subject to any disclaimer, the term of this patent is extended or adjusted under 35 U.S.C. 154(b) by 606 days.

(21) Appl. No.: 17/538,123

(22) Filed: Nov. 30, 2021

Related U.S. Application Data

(60) Provisional application No. 63/119,104, filed on Nov. 30, 2020.

(51) Int. Cl.
| | |
|---|---|
| A62C 35/02 | (2006.01) |
| A62C 3/02 | (2006.01) |
| A62C 31/24 | (2006.01) |
| A62C 35/68 | (2006.01) |
| H02J 7/00 | (2006.01) |
| H02J 7/35 | (2006.01) |
| H02S 20/10 | (2014.01) |
| H02S 40/32 | (2014.01) |
| H02S 40/38 | (2014.01) |
| E04H 4/00 | (2006.01) |

(52) U.S. Cl.
CPC .......... *A62C 35/026* (2013.01); *A62C 3/0214* (2013.01); *A62C 3/0292* (2013.01); *A62C 35/68* (2013.01); *H02J 7/0013* (2013.01); *H02J 7/35* (2013.01); *H02S 20/10* (2014.12); *H02S 40/32* (2014.12); *H02S 40/38* (2014.12); *A62C 31/24* (2013.01); *E04H 4/00* (2013.01)

(58) Field of Classification Search
CPC ....... A62C 3/02; A62C 3/0214; A62C 3/0271; A62C 3/0292; A62C 31/24; A62C 31/28; A62C 33/04; A62C 35/02; A62C 35/026; A62C 35/11; A62C 35/68
See application file for complete search history.

(56) References Cited

U.S. PATENT DOCUMENTS

| | | | |
|---|---|---|---|
| 3,179,181 A | | 4/1965 | Banzato |
| 4,330,040 A | | 5/1982 | Ence et al. |
| 5,125,458 A | | 6/1992 | Berman |
| 5,249,632 A | * | 10/1993 | Sparling ............... B05B 15/654 |
| | | | 239/275 |
| 5,366,021 A | | 11/1994 | Coleman |
| 5,732,511 A | * | 3/1998 | Scott .................... A62C 3/0214 |
| | | | 52/168 |
| 5,909,983 A | * | 6/1999 | McGee, Jr. .......... A62C 35/026 |
| | | | 169/14 |
| 5,931,233 A | | 8/1999 | La Bonte et al. |
| 8,555,989 B1 | | 10/2013 | Agajanian |
| 2004/0045613 A1 | | 3/2004 | Hinojosa, Jr. et al. |

(Continued)

FOREIGN PATENT DOCUMENTS

| | | | | |
|---|---|---|---|---|
| EP | 1561494 A1 | * | 8/2005 | .......... A62C 3/0214 |
| FR | 2859637 A1 | * | 3/2005 | .......... A62C 3/0214 |
| FR | 2996461 A1 | * | 4/2014 | ............... A62C 2/08 |

*Primary Examiner* — Darren W Gorman
(74) *Attorney, Agent, or Firm* — Cramer Patent & Design, PLLC.; Aaron R. Cramer

(57) ABSTRACT

A fire suppression device has a pump and spray nozzle in hydraulic communication with the interior environment of a swimming pool. The pump and spray nozzle are capable of remote and automatic operation by wireless sensors configured to direct a stream of liquid upon an adjacent fire. The device may be powered via solar power.

1 Claim, 5 Drawing Sheets

(56) References Cited

U.S. PATENT DOCUMENTS

| | | | | |
|---|---|---|---|---|
| 2007/0158083 A1* | 7/2007 | Duncan | ............... | A62C 3/0292 |
| | | | | 169/37 |
| 2009/0151961 A1* | 6/2009 | Voorhees | .............. | A62C 3/0264 |
| | | | | 169/13 |
| 2010/0000743 A1* | 1/2010 | Cohen | ................ | A01G 25/167 |
| | | | | 169/5 |
| 2010/0071917 A1* | 3/2010 | Lalouz | ................ | A62C 3/0214 |
| | | | | 169/60 |
| 2010/0236799 A1* | 9/2010 | Vetesnik | .................. | A62C 5/02 |
| | | | | 169/70 |
| 2011/0114341 A1 | 5/2011 | Claffey et al. | | |
| 2013/0020098 A1* | 1/2013 | Bui | ...................... | A62C 3/0214 |
| | | | | 169/45 |
| 2014/0374127 A1* | 12/2014 | Dalmau Rovira | ..... | A62C 35/68 |
| | | | | 169/48 |
| 2016/0175633 A1* | 6/2016 | Smith | ................. | A62C 3/0214 |
| | | | | 169/61 |
| 2018/0015316 A1* | 1/2018 | Mitchell | ............. | A62C 35/026 |
| 2018/0339180 A1* | 11/2018 | Weber | .................. | G08B 17/005 |
| 2019/0262637 A1* | 8/2019 | Statter | ................. | A62C 3/0271 |
| 2019/0356264 A1* | 11/2019 | Alan | .................... | A62C 3/0214 |
| 2020/0338375 A1* | 10/2020 | Council | ................ | A62C 37/40 |

* cited by examiner

SWIMMING POOL FIRE SUPPRESSION MEANS AND DELIVERY SYSTEM THEREFOR

RELATED APPLICATIONS

The present invention is a continuation of U.S. Provisional Application No. 63/119,104 filed on Nov. 30, 2020, the entire disclosures of which are incorporated herein by reference.

FIELD OF THE INVENTION

The present invention relates to a fire suppression means that employs the use of water derived from a swimming pool.

BACKGROUND OF THE INVENTION

Forest fires have plagued mankind from the beginning of time. We now know that some destruction of forest areas is necessary for the proper development and stability of plant and animal species, thus man has let some fires take their natural course. However, when such forest fires are located near populated areas where rebuilding costs would be great and lives may possibly be lost, the decision to fight the fire is an easy decision. While many of these fires are fought by professional firefighters, due to lack of available personnel, homeowners themselves often pick up a garden hose to protect their roofs from falling embers. This of course places the homeowner at risk since they must remain outside continuously until the threat of fire has passed, even through the night and for days on end if necessary. Additionally, the homeowner can only cover a small portion of the total roof at one time. Finally, the water pressure may be reduced due to other nearby firefighting activities, and the homeowner can only cover even a smaller area of roof. Of course, an even worse situation exists in those instances where a municipal water supply is not available or has failed due to other firefighting efforts. Accordingly, there exists a need for a means by which houses, buildings and other structures can be protected from falling embers from nearby forest fires, wildfires, or even nearby structure fires in an automatic and simple manner. The development of the swimming pool fire suppression device fulfills this need.

SUMMARY OF THE INVENTION

In view of the foregoing references, the inventor recognized the aforementioned inherent problems and observed that there is a need for a fire suppression device that has, a pump having a pump enclosure with a suction line and a discharge line, a discharge nozzle disposed on a first end of the discharge line, a photovoltaic cell disposed on the pump enclosure, a transfer switch disposed on the pump enclosure, and a main power switch disposed on the pump enclosure, the main power switch activates the fire suppression device. The suction line and the discharge line are in mechanical and fluid connection with the pump and the suction line is disposed at the pump enclosure at a first end of the suction line terminating at a bottom of a body of water at a second end of the suction line. The discharge nozzle is supported by a support stand equipped with a reciprocating mechanism. The photovoltaic cell generating electrical power to a backup power system during a power failure. The transfer switch selects between an AC power cord or an AC inverter to provide power to the motor.

The fire suppression device may further comprise a weight keeping the suction line from floating to a top surface of the body of water. The weight may be removably attached to the suction line at the second end. The weight may be bonded to the suction line at the second end. The weight may be removably attached adjacent to the suction line at the second end. The weight may be bonded adjacent to the suction line at the second end. The fire suppression device may further comprise a filter disposed at the second end of the suction line and covering an entrance thereto to prevent entrance of one or more foreign materials therein. The suction line may include a depth adjustment system to accommodate the body of water of varying depths. The depth adjustment system may be removably attached to an exterior of the suction line. The first end of the suction line may be in fluid communication with the inlet of the pump and the second end of the discharge line is in fluid communication with the outlet of the pump. The fire suppression device may further comprise a motor generating a plurality of rotary power to the pump via a drive shaft to induce a transfer of the water from the body of water into a plurality of pressurized water release to an exterior environment.

The fire suppression device may be selected from the group consisting of a swimming pool, a pond, a lake, a stream, one or more stormwater retention ponds, or a river. The reciprocating mechanism may selectively operate in a manual mode by manipulation of a directional handle. The reciprocating mechanism may selectively operate in an automatic mode. The support stand may include a weighted base to withstand a plurality of thrust forces thereupon from the discharge line and the discharge nozzle. The fire suppression device may further comprise a disconnect switch to shut-off the reciprocating mechanism to operate in a manual mode of the discharge line to manually direct the discharge nozzle via the directional handle. The fire suppression device may further comprise a low-level water sensor capable of sensing a low level of the water in the body of water to deactivate the fire suppression device. The low-level water sensor may be a float switch. The AC inverter may receive input power from the rechargeable batteries, while a charge controller may provide electrical power to the rechargeable batteries in a regulated form as received from the photovoltaic cell. The rechargeable batteries may be charged from the charge controller which may receive input power from the photovoltaic cell.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
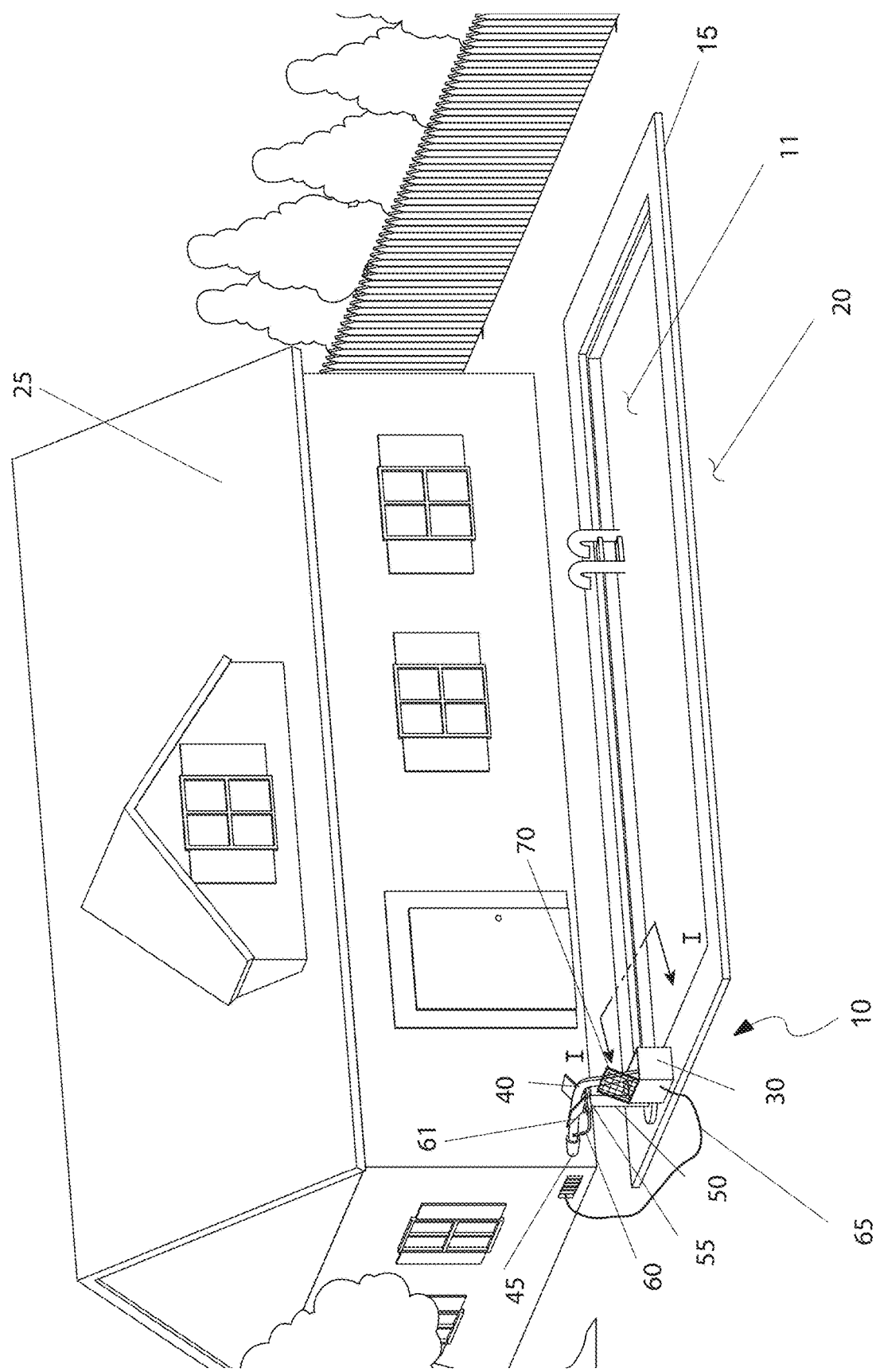
FIG. 1 is a perspective view of the swimming pool fire suppression device, shown in an installed state, according to the preferred embodiment of the present invention.

DESCRIPTIVE KEY 10 swimming pool fire suppression device
11 water
15 swimming pool
20 yard
25 residence
30 pump enclosure
35 suction line
40 discharge line
45 discharge nozzle
50 support stand
55 reciprocating mechanism
60 directional handle
61 cradle
65 AC power cord
70 photovoltaic cell
75 pool bottom
80 weight
85 filter
90 depth adjustment system
95 weighted base
99 cabling
100 disconnect switch
101 low-level water sensor
104 drive shaft
105 pump
110 motor
115 pump base
120 transfer switch
125 AC inverter
130 rechargeable battery
135 charge controller
140 main power switch
145 residential fire
150 wildfire
155 pressurized water
160 radial travel path "r"
165 elevational travel path "e"

DESCRIPTION OF THE INVENTION

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the swimming pool fire suppression device 10, shown in an installed state, according to the preferred embodiment of the present invention is disclosed. The swimming pool fire suppression device 10 (herein also described as the "device") 10, provides for a fire extinguishing and active fire prevention system that utilizes water 11 from a body of water 15, such as a swimming pool 15 and creates a stream of pressurized water 155 in order to be directed to extinguish a residential fire or a wildfire 150. The device 10 is shown utilized adjacent to and with a swimming pool 15 in the yard 20 of a residence 25. However, the device 10 will operate with any substantial body of water 15 including, but not limited to: a pond, a lake, a stream, one or more stormwater retention ponds, a river, or the like. As such, the use of the device 10 in a swimming pool 15 is not intended to be a limiting factor of the present invention.

The device 10 provides for a pump enclosure 30 with a suction line 35 (not visible in this view due to illustrative limitations) and a discharge line 40. A discharge nozzle 45, similar in size and construction to a fire hose nozzle is provided on a first end of the discharge line 40 and is supported by a support stand 50 equipped with a reciprocating mechanism 55. The reciprocating mechanism 55 can selectively be operated in either a manual mode by manipulation of a directional handle 60 or in an automatic mode. The automatic mode of the reciprocating mechanism 55 will be described in greater detail herein below. The device 10 is powered by an AC power cord 65. In the event of a power failure, a photovoltaic cell 70 integrated with the device 10 is capable of providing power to a backup power system which will be described in greater detail herein below.

Figure 2:
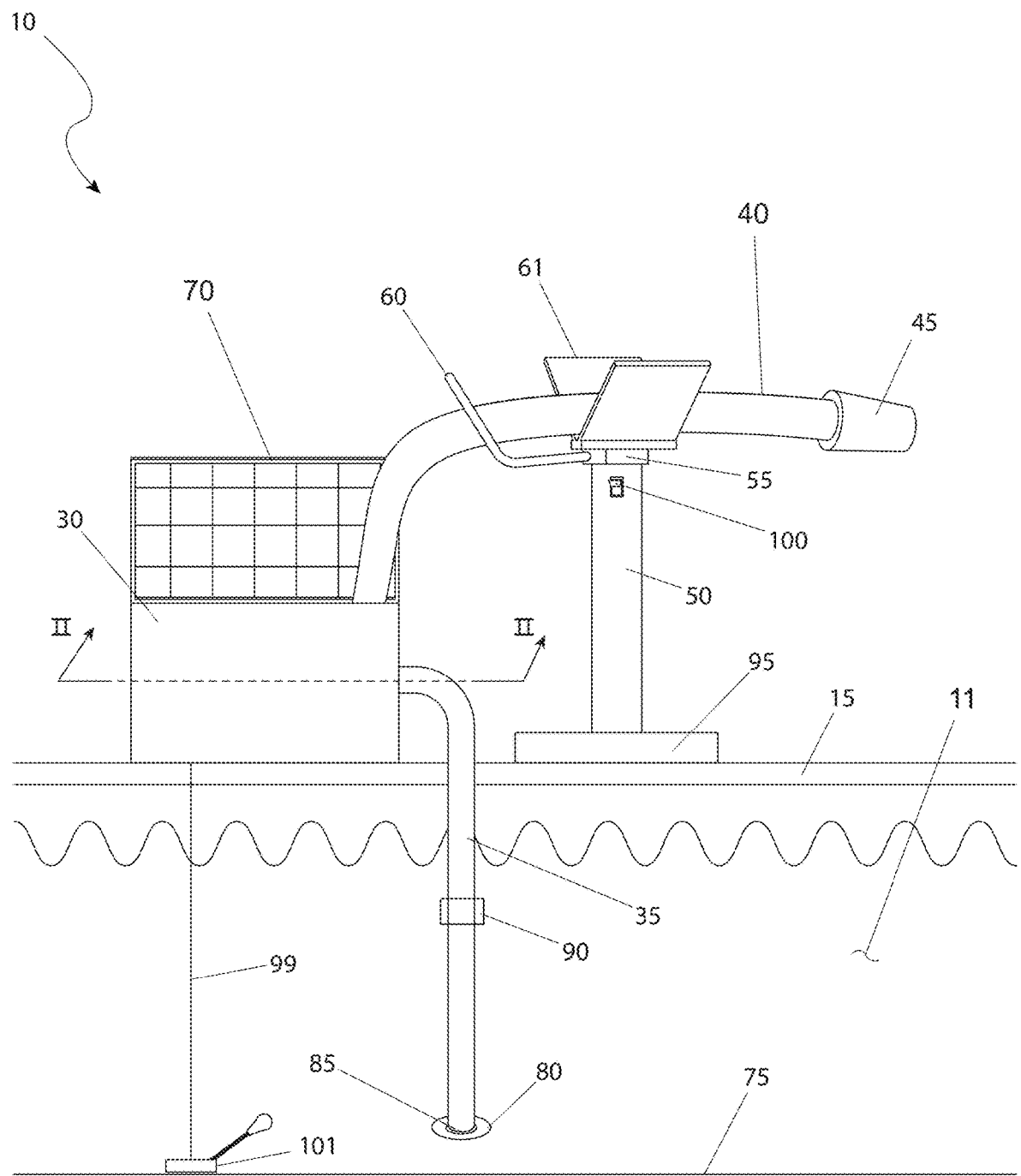
FIG. 2 is a pictorial sectional view of the swimming pool fire suppression device, as seen along a Line I-I, as shown in FIG. 1, according to the preferred embodiment of the present invention.

Referring next to FIG. 2, a sectional view of the device 10, as seen along a Line I-I, as shown in FIG. 1, according to the preferred embodiment of the present invention is depicted. This view fully illustrates the suction line 35 originating at the pump enclosure 30 at a first end and terminating at the pool bottom 75 at a second end. A weight 80 keeps the suction line 35 properly positioned and prevents the suction line 35 from floating to the surface. The weight 80 can be removably attached to or bonded to the suction line 35 either at or adjacent to the second end. A filter 85, also preferably located at the second end of the suction line 35 and covering an entrance thereto, prevents the entrance of foreign material therein. Additionally, the suction line 35 is provided with a depth adjustment system 90 to accommodate swimming pools 15 of varying depths. Such a depth adjustment system 90 can be removably attached to the exterior of the suction line 35.

The support stand 50 is provided with a weighted base 95 to withstand any high thrust forces thereupon from the discharge line 40 and discharge nozzle 45 when the device 10 is operating. The reciprocating mechanism 55 is envisioned to be capable of three-hundred-sixty-degree (360°) operation. A disconnect switch 100 allows for removal of power to the reciprocating mechanism 55 to enable for operation in the manual mode of the discharge line 40 to manually direct the exit of the discharge nozzle 45 via the directional handle 60. A low-level water sensor 101, such as a float switch, is capable of sensing a low level of water 11 in the swimming pool 15 and can deactivate features of the device 10.

Figure 3:
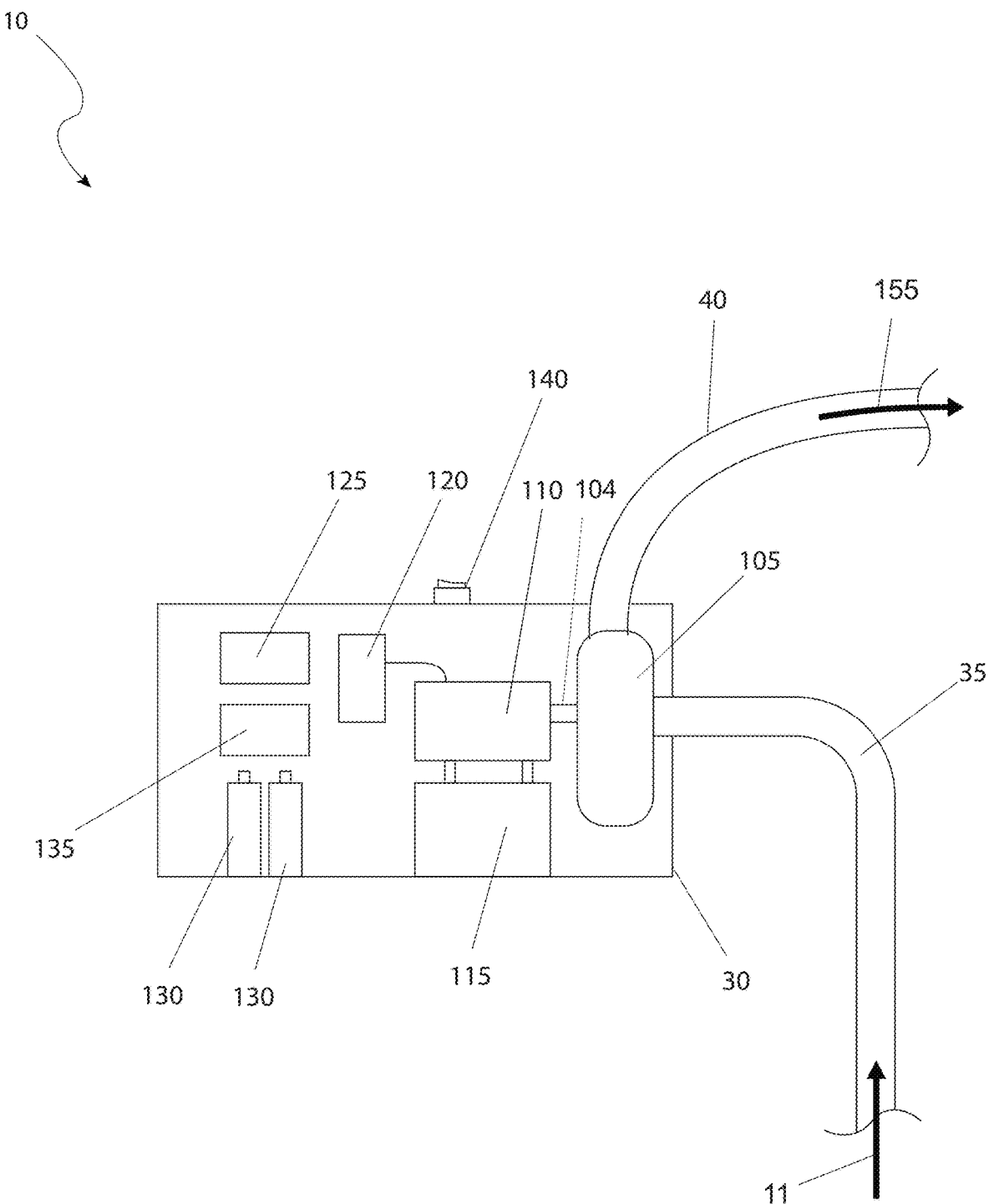
FIG. 3 is a sectional view of the swimming pool fire suppression device, as seen along a Line II-II, as shown in FIG. 2, according to the preferred embodiment of the present invention.

Referring now to FIG. 3, a pictorial sectional view of the device 10, as seen along a line II-II, as shown in FIG. 2, according to the preferred embodiment of the present invention is shown. This view discloses the interior of the pump enclosure 30. The suction line 35 and the discharge line 40 are in mechanical and fluid connection with a pump 105. The first end of the suction line 35 is in fluid communication with the inlet of the pump 105 and the second end of the discharge line 40 is in fluid communication with the outlet of the pump 105. A motor 110, sitting on a pump base 115, provides rotary power to the pump 105 via a drive shaft 104. The motor 110 activates the pump 105 to induce a transfer of water 11 from the body of water 15 into pressurized water 155 for release to the environment. A transfer switch 120 selects between the AC power cord 65 (as shown in FIG. 1) or an AC inverter 125 to provide power to the motor 110. The AC inverter 125 receives input power from multiple rechargeable batteries 130. A charge controller 135 in turn provides power to the rechargeable batteries 130 in a regulated form as received from the photovoltaic cell 70 (as shown in FIG. 1). A main power switch 140 allows for activation of the device 10. Further details on the electrical interconnection of the above-mentioned components will be described in greater detail hereinbelow.

Figure 4:
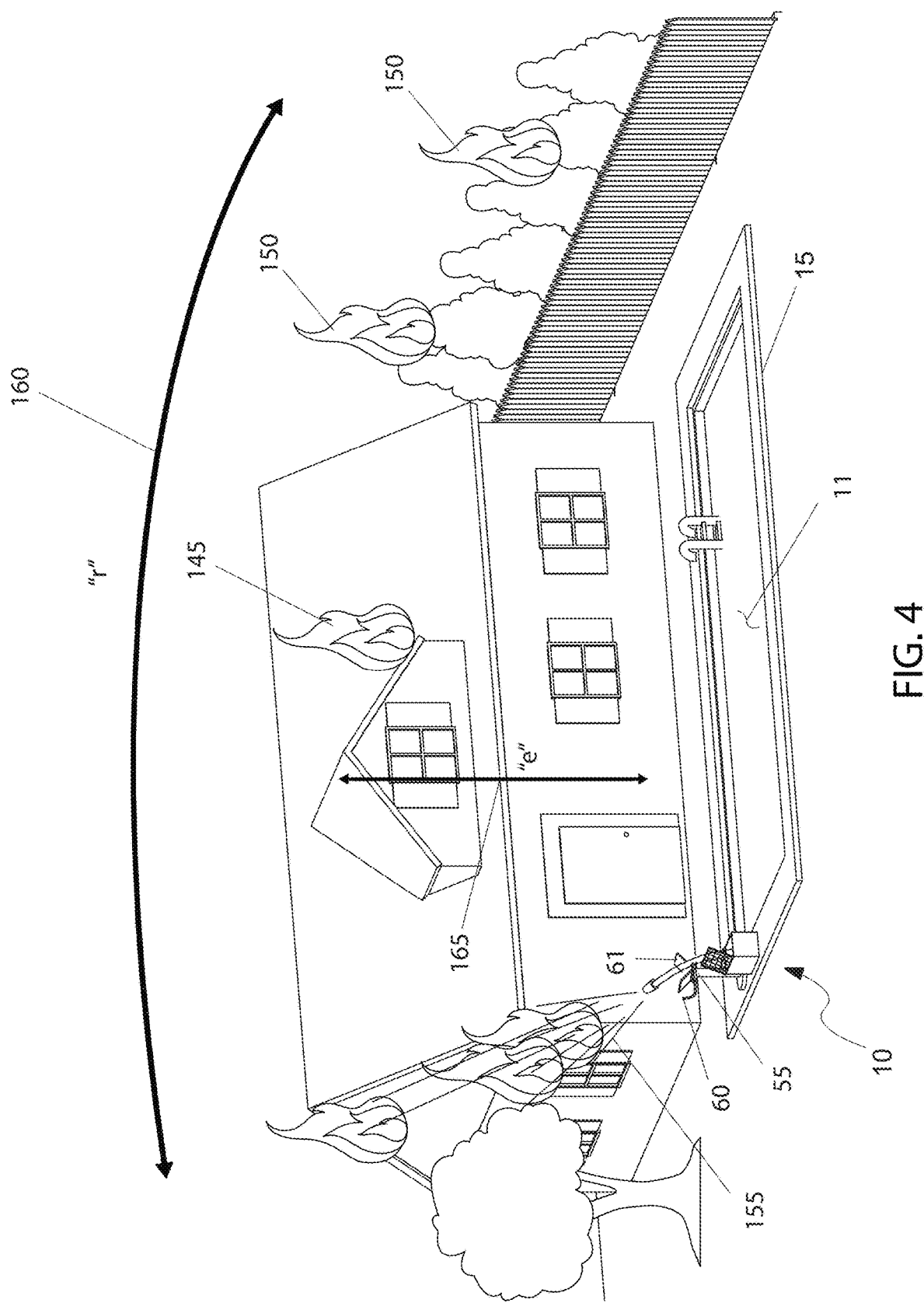
FIG. 4 is a perspective view of the swimming pool fire suppression device, shown in an installed and utilized state, according to the preferred embodiment of the present invention.

Referring next to FIG. 4, a perspective view of the device 10, shown in an installed and utilized state, according to the preferred embodiment of the present invention is disclosed. In the event of a residential fire 145 or a wildfire 150, the device 10 could be activated, and operated by a previously trained individual. The individual would utilize the directional handle 60 to direct a high-powered stream of pressurized water 155 along a radial travel path "r" 160 and a simultaneous elevational travel path "e" 165. Should an evacuation be required, the user would activate the reciprocating mechanism 55 via the disconnect switch 100 (as shown in FIG. 2), to enable operation of the automatic mode of the discharge nozzle 45 along the radial travel path "r" 160. The discharge nozzle 45 would then spray a stream of pressurized water 155 until stopped or the supply of water 11 is depleted.

Figure 5:
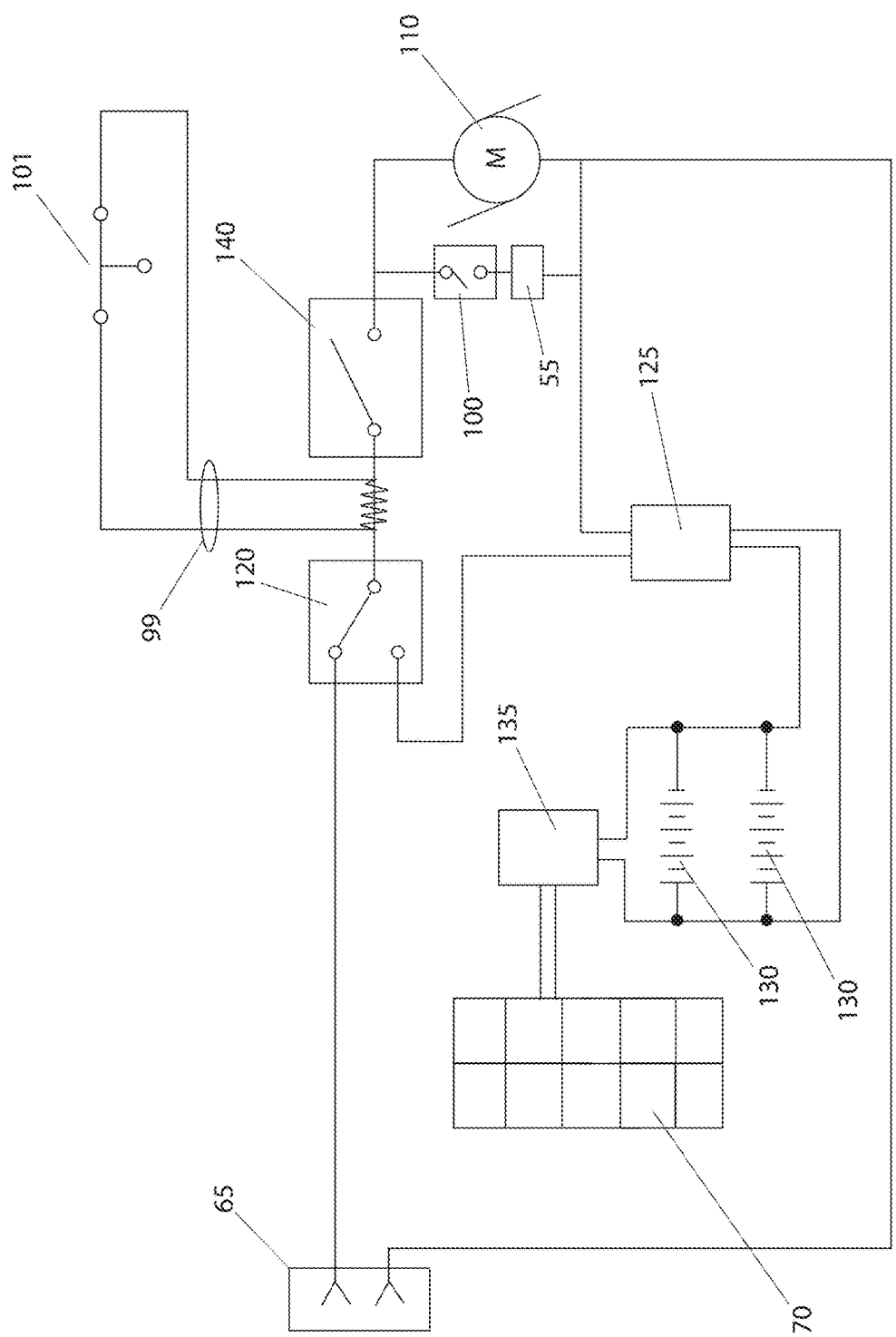
FIG. 5 is an electrical block diagram of the swimming pool fire suppression device, according to the preferred embodiment of the present invention.

Referring to FIG. 5, an electrical block diagram of the device 10, according to the preferred embodiment of the present invention is depicted. The AC power cord 65 provides electrical power to one (1) input of the transfer switch 120. The other input is provided power from the AC inverter 125. The AC inverter 125 receives DC power from the rechargeable batteries 130 and converts it into AC power. The rechargeable batteries 130 are charged from the charge controller 135 which receives input power from the photovoltaic cell 70. The output of the transfer switch 120 is then routed to the main power switch 140 which controls all power to the reciprocating mechanism 55 and the motor 110. The reciprocating mechanism 55 also receives power from the main power switch 140 through the disconnect switch 100. If closed, the reciprocating mechanism 55 operates in automatic mode to produce a stream of pressurized water 155 along the radial travel path "r" 160 (as shown in FIG. 4). If open, the reciprocating mechanism 55 is de-energized, allowing for enablement of the manual mode via manipulation of the directional handle 60. The low-level water sensor 101 is in electrical communication via cabling 99 with the disconnect switch 100 and the main power switch 140. Upon sensing a pre-determined low water 11 level, the low-level water sensor 101 controls the disconnect switch 100 to deactivate the reciprocating mechanism 55 and the motor 110 to the pump 105.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as hardware stores, home improvement stores, mechanical supply houses, mail order and internet supply houses and the like.

After procurement and prior to utilization, the device 10 would be prepared in the following manner: the pump enclosure 30 would be installed alongside the swimming pool 15 or other suitable body of water 15; the support stand 50 and weighted base 95 would be located where the necessary stream of pressurized water 155 to combat both a residential fire 145 and wildfire 150 could be produced; the suction line 35 is placed in fluid communication with the inlet of the pump 105 and the discharge line 40 is placed in fluid communication with the outlet of the pump 105; and electrical connections for the AC power cord 65 and the photovoltaic cell 70 would be installed. At this point in time, the device 10 is ready for operation.

During utilization of the device 10, the following procedure would be initiated: in the event of a residential fire 145 or wildfire 150 where evacuations are not called for, the user would activate the main power switch 140 and ensure that the disconnect switch 100 is in the OFF position and thus placing the device 10 in a manual mode; the user would then direct the resultant stream of pressurized water 155 via the directional handle 60 to extinguish the residential fire 145 or wildfire 150. In the event an evacuation is necessary, the user would activate both the main power switch 140 and the disconnect switch 100 thus placing the device 10 in automatic mode to allow for automatic spraying of a stream of pressurized water 155 to extinguish or prevent any residential fire 145 or wildfire 150.

After use of the device 10, it is deactivated by the main power switch 140 until needed again. It should be ensured that any utilized water 11 from the swimming pool 15 is replenished to prepare for subsequent use thereof.

It is noted that the device 10 provides the following benefits over conventional firefighting methods: the device 10 generates and sprays pressurized water 155 on residences 25, structures, yards 20, and vegetation to prevent them from catching fire in high-danger fire situations; the device 10 prevents glowing ashes and embers from adjacent wildfires 150 from igniting other residences 25, structures, yards 20, or vegetation; and the device 10 prevents the necessity of having someone stand outside to spray down a roof of a residence 25 with a garden hose. The device 10 is perfect for residences 25 in wildfire 150 prone areas and is ideal for residences 25 along brush lines.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A fire suppression device, consisting of:
- a pump enclosure;
- a suction line having a first end and a second end, wherein the first end is disposed at the pump enclosure and is in fluid communication with an inlet of a pump, and wherein the second end is configured to be positioned at a bottom of a body of water;
- a weight bonded to the suction line at the second end, wherein the weight is configured to prevent the suction line from floating to a surface of the body of water;
- a filter disposed at the second end of the suction line and covering an entrance thereto, wherein the filter is configured to prevent ingress of foreign material into the suction line;
- a discharge line having a first end and a second end, wherein the first end is in fluid communication with an outlet of the pump;
- a discharge nozzle disposed at the second end of the discharge line, wherein the discharge nozzle is configured to discharge a stream of pressurized water to an exterior environment;
- a support stand having a weighted base, wherein the weighted base is configured to support the discharge nozzle during operation and withstand thrust forces exerted by the discharge line and discharge nozzle;
- a motor disposed within the pump enclosure and mechanically connected to the pump by a drive shaft, wherein the motor is configured to generate rotary power to the pump to induce transfer of water from the body of water through the suction line and discharge line to the discharge nozzle;
- a photovoltaic cell disposed on the pump enclosure, wherein the photovoltaic cell is configured to generate electrical power during a power failure;
- a rechargeable battery electrically connected to the photovoltaic cell, wherein the rechargeable battery receives regulated input power from a charge controller;
- an AC inverter configured to receive power from the rechargeable battery and supply AC power to the motor;
- a transfer switch disposed on the pump enclosure and configured to select between power from an AC power cord and power from the AC inverter; and,
- a main power switch disposed on the pump enclosure and configured to activate the fire suppression device.

* * * * *